United States Patent Office 3,424,015
Patented Jan. 28, 1969

3,424,015
MECHANISM FOR DRIVING A COMPONENT IN TRANSLATIONAL MOTION ALONG A CLOSED CURVE
Claude Lundy, Villepreux, and Marc Pouliquin, Paris, France, assignors to Commissariat a l'Energie Atomique, Paris, France
Filed Mar. 20, 1967, Ser. No. 624,469
Claims priority, application France, Mar. 29, 1966, 55,542
U.S. Cl. 74—50   5 Claims
Int. Cl. F16j *15/50;* F16h *21/28*

ABSTRACT OF THE DISCLOSURE

A mechanism for transforming a driving movement of rotation into a movement of translation along a closed curve wherein the driven component is rotationally locked and permitted to perform only a translational displacement by virtue of an annular member which is freely mounted to perform a rotational movement about a cranked drive shaft but which is always locked rotationally both with a stationary bearing and with the driven component.

---

This invention relates to a mechanism for driving a component in translation along a closed curve and more especially in circular translational motion.

A displacement of this type is usually produced from a rotational movement imparted to a gear-wheel or shaft which must be converted to a displacement along the curve to be followed without thereby imparting to the component which is thus driven any secondary movements such as a movement of rotation of said component either about its own axis or relatively to the support on which the mechanism is carried.

The transformation of rotational motion into a circular displacement can be carried out by means of a drive system of the crankshaft type on which the component to be driven is rotatably mounted; but it proves more difficult to separate the translational motion if it is desired to provide a system which is both of relatively simple design and which can readily be adapted to machines of different types.

The aim of this invention is to meet the above requirement by providing a drive mechanism in which a very simple assembly ensures extremely effective elimination of extraneous movements.

The mechanism in accordance with the invention essentially comprises two parallel shafts wherein one shaft is adapted to rotate in a stationary bearing whilst the other shaft is adapted to support the component to be driven and wherein an eccentric-displacement crank forms a junction section between said two shafts, said device being characterized in that an annular member is placed around said crank and rotationally locked on the one hand with said stationary bearing and on the other hand with the component to be driven.

The component to be driven is thus coupled to the stationary bearing, and is therefore secured against rotation and permitted to carry out only a movement of translation.

In a first form of construction, the mechanism comprises a tube which is placed around the crank and provided with two internal sets of teeth, one internal set being tangent to an outer set of spherical teeth of the stationary bearing and the other internal set being tangent to a set of spherical teeth of the component to be driven.

In a second form of construction, the annular member is a tube having an extension at each end in the form of two arms pivotally coupled to a ring which is coaxial with the shaft and which is capable of pivoting diametrically in the stationary bearing or in the component to be driven but which is locked rotationally with respect to said component or bearing.

In another alternative form of construction, the rotational locking member is an annular ring provided on one side with two diametrically opposite teeth which are capable of sliding in corresponding grooves of the stationary bearing and on the other side with two other teeth which are also diametrically opposite and capable of sliding in corresponding grooves of the component to be driven, the two series of teeth having directions at right angles to each other.

Whatever shape or form of construction may be adopted, the aforesaid rotational locking member is of extremely simple design and is readily fitted on the drive shaft. In addition, said member is of small overall size and can consequently be easily isolated if necessary from the surrounding atmosphere.

A number of other properties and advantages of the invention will become apparent from the following description of forms of construction which are given solely by way of non-limitative example, reference being made to the accompanying drawings, in which.

Figure 1:
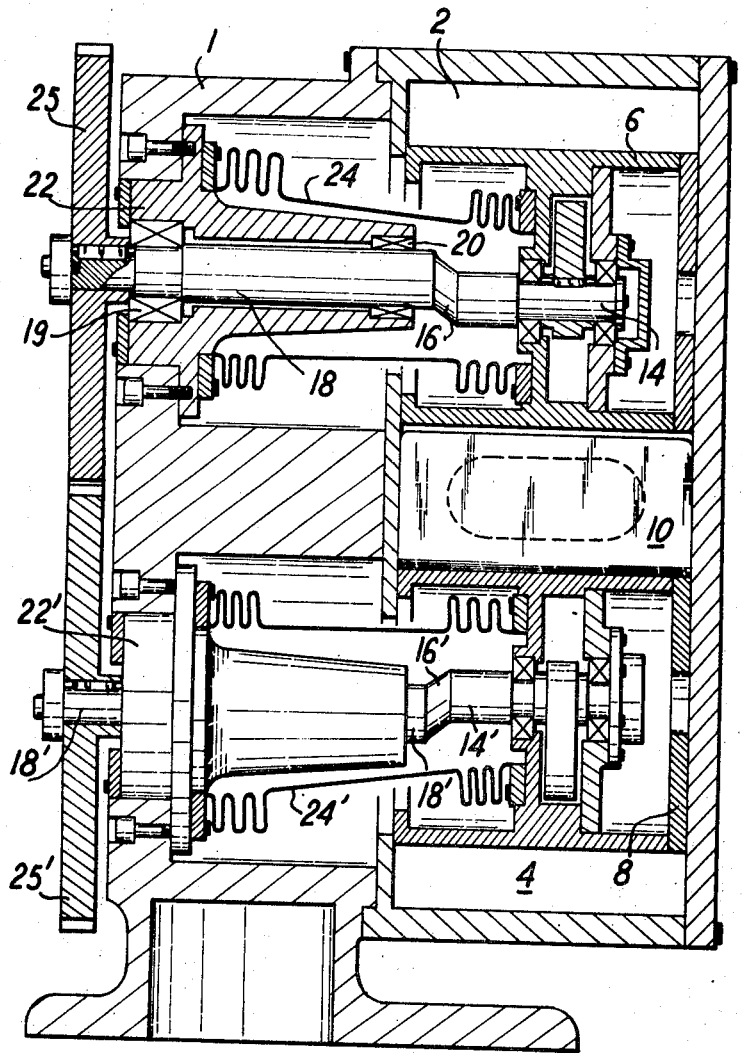
FIG. 1 is an axial sectional view of a pump having two pistons moving in circular translational motion.

The pump which is illustrated in FIG. 1 comprises within a casing 1 two cylindrical chambers 2, 4 which communicate with each other and inside which two pistons 6, 8 are adapted to move in symmetrical relation, each piston being fitted with a pallet 10 at right angles to its axis. The two pallets thus provide a separation between a fluid inlet and fluid outlet which are coaxial with each other, and are intended to slide one against the other during the movement of the pistons but always to remain in contact with each other.

The pistons 6 and 8 are each mounted by means of roller bearings 12 on a shaft 14, 14', said shaft being joined by a cranked section 16, 16' to a second shaft 18, 18' which is parallel to the shaft 14. The shaft 18, 18' is supported by means of roller bearings 19, 20 in a stationary bearing 22, 22' which is fixed in the casing 1. A bellows element 24, 24' which is secured at one end to the piston 6, 8 and at the other end to said bearing 22, 22' provides leak-tightness between the cylindrical chambers and the exterior. The shaft 18, 18' is fixed externally of the bearing 22, 22' and casing 1 to the center of a gear-wheel 25, 25', both gear-wheels being identical and engaged with each other. A pinion which is not shown in the drawings and driven from a motor system of any suitable type is adapted to drive one of said gear-wheels which thus rotate in opposite directions.

The shafts 18 and 18' are also adapted to rotate in opposite directions in their stationary bearings 22, 22' and produce by means of the cranks 16, 16' the displacement of the shafts 14, 14' about their axes. The pistons 6 and 8 are also caused to move about the axes of the shafts 18, 18' which coincide with the axes of the chambers 2 and 4.

Figure 2:
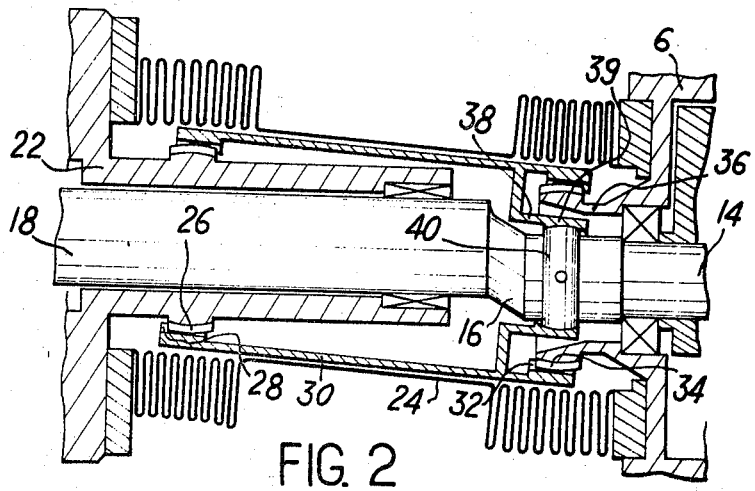
FIG. 2 is an axial sectional view of a device for driving one of the pistons of said pump.

However, in accordance with the invention, the bearing 22 is provided with a set of spherical teeth 26 as shown in FIG. 2. Said spherical teeth are engaged with an internal set of teeth 28 of a tube 30 which is adapted to surround the end of the bearing 22 and the end of the shaft 18 as well as the crank 16 and the initial portion of the shaft 14. The tube 30 comprises a second set of teeth 32 which are engaged with a set of spherical teeth 34 carried by the piston 6. The teeth of said second set 32 as well as the teeth of the set 28 are tangent to those of the corresponding set of spherical teeth.

Said piston 6 is provided with an extension in the form of a sleeve 36 which is adapted to surround the shaft 14 and serves as a support for said set of teeth 34. The diameter of said sleeve is distinctly larger than that of the shaft 14, thus making it possible to place between these two elements a sleeve 38 which is integral with the tube 30 and has an internal surface in the form of a spherical zone 39. A knuckle-joint 40 which is rigidly fixed to the shaft 14 and applied against said spherical zone 39 is designed to prevent any relative axial displacement of these two elements.

At the time of rotation of the shaft 18 within the bearing 22 which results in the circular translational motion of the shaft 14 and of the piston 6, the tube 30 is caused to perform a pivotal movement in which it is guided by the displacement of the teeth 28 over the teeth 26 but is not permitted to rotate by reason of the fact that the teeth 26 of the stationary bearing are motionless. Similarly, at the other end of the tube 24, the teeth 32 pivot on the teeth 34 but are locked rotationally with these latter. Consequently, there cannot take place any rotational motion of the piston relatively to the bearing 22 or even any rotation of the piston about its axis and said piston is endowed only with the circular translational motion of the shaft 14.

In the case of the pump of FIG. 1, both pistons 6 and 8 are equipped with the same mechanism and rotationally locked in the same manner with respect to the stationary bearings and consequently with respect to the casing 1. Said pistons are therefore unable to rotate relatively to each other and their movements are exactly limited to a movement of translation about the chambers 2 and 4.

Figure 3:
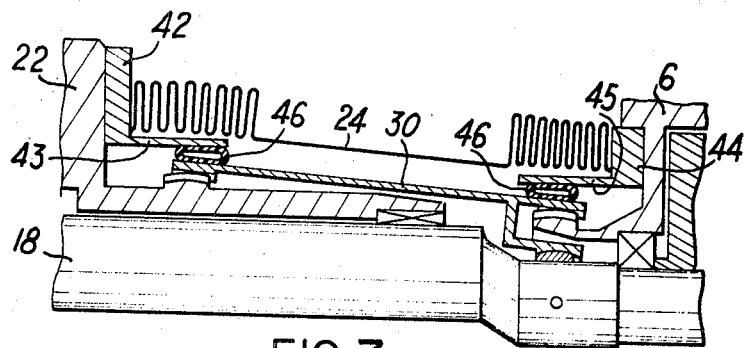
FIG. 3 is an axial sectional view of the drive mechanism of FIG. 2 which is provided with a safety sealing system.

In some cases, in order to increase the leak-tightness of the system, the bellows element 24 is attached to the bearing and to the piston 6 by means of flanges 42, 44, as shown in FIG. 3. Said flanges are provided with extensions in the form of cylindrical sleeves 43, 45, each sleeve being fixed on an annular seal 46 which is rigidly fixed to the tube 30. The complete assembly consisting of the belows element 24, the two sleeves 43, 44 and the tube 30 thus delimits a closed and strictly leak-tight chamber which can, for example, be filled with neutral fluid, thereby completely isolating the piston-driving mechanism proper. In the event of rupture of the bellows seal 24, leak-tightness continues to be maintained by the tube 30 and the sleeves 43, 45.

Figure 4:
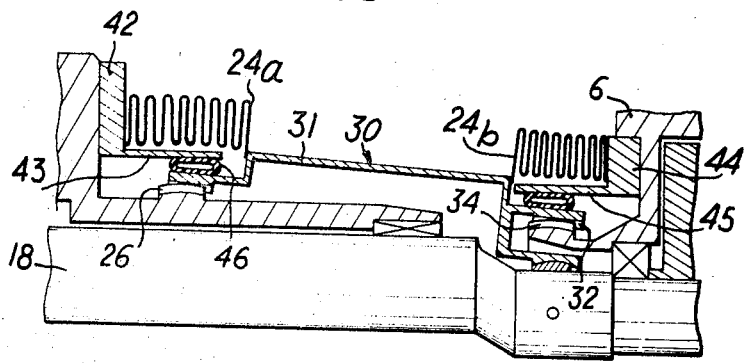
FIG. 4 is an axial sectional view showing an alternative form of construction of the drive mechanism of FIG. 3.

In accordance with an alternative form of construction which is illustrated in FIG. 4, the tube 30 serves directly as a support for the bellows element 24. In this design, said tube is provided with a central portion 31 of larger diameter than the ends which carry the teeth and the bellows element 24 is formed of two sections 24a, 24b each attached at one end to said portion 31 and at the other end to the flange 42 or 44. Each bellows element 24a or 24b delimits with the corresponding sleeve 43, 45 a safety sealing chamber.

It is apparent that the drive mechanism which has just been described is not limited to the construction of pumps having two symmetrical pistons as shown in FIG. 1 but can be mounted on any type of apparatus comprising a component which is to be driven in circular translational motion.

Figure 5:
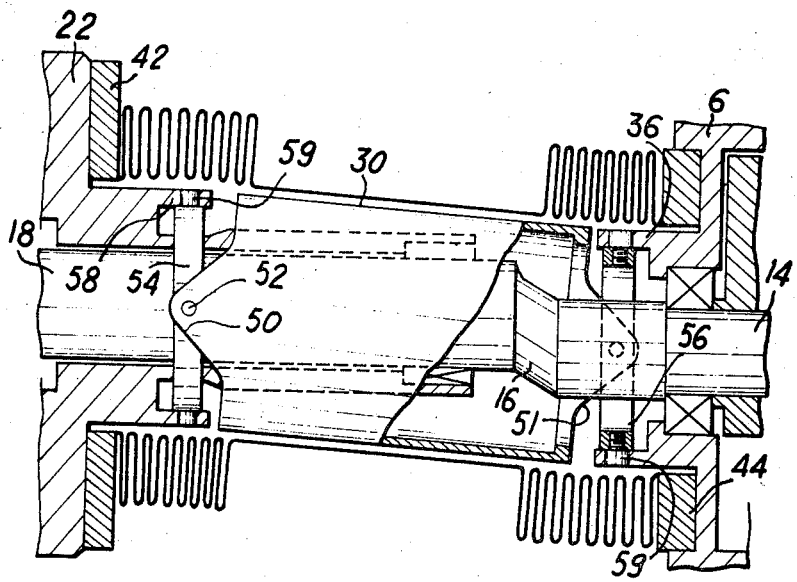
FIG. 5 is an axial sectional view showing an alternative form of construction of the drive mechanism.
Figure 6:
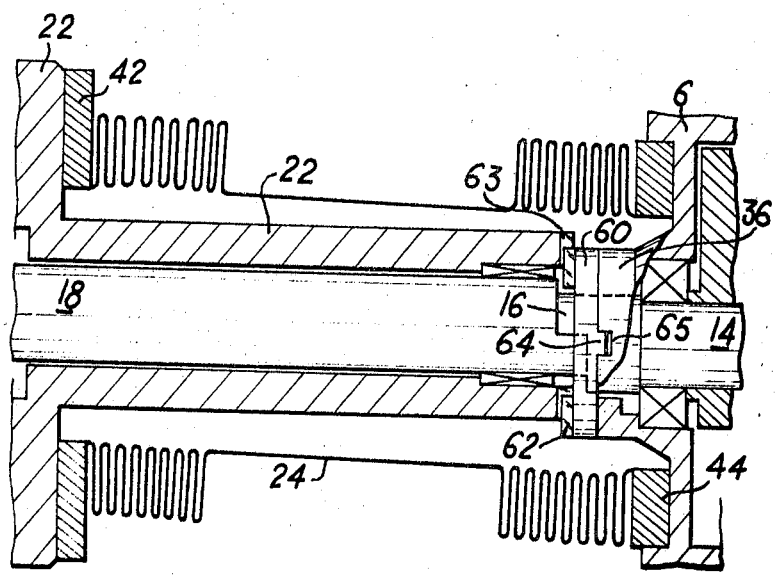
FIG. 6 shows another alternative form of construction of the same drive mechanism.

This application has been given solely by way of explanatory example. Accordingly, a number of different modifications could be made to the mechanism described without thereby departing from the scope of the invention. For example, in the embodiment shown in FIG. 5, the tube 30 which surrounds the crank 16 and the extremities of the shafts 18 and 14 is no longer provided with teeth but has an extension at each end in the form of two diametrically opposite arms 50, 51 traversed by pins 52 for the articulation of said tube on a ring 54 or 56 which is pivotally mounted on the stationary bearing 22 or on the piston 6. The ring 54, which surrounds the bearing 22, is maintained in an annular end-piece 58 and coupled thereto by means of two screws 59 which are fixed in said end-piece and screwed diametrically in the ring 54. Similarly, the ring 56 is mounted on two diametrically opposite screws within the sleeve 36 which serves as an extension of the piston 6.

The rings 54 and 56 are thus locked rotationally with the stationary bearing 22 and piston 6 respectively whilst the tube 30 is locked rotationally with each of said rings. No movement of the piston relative to the bearing is therefore possible and the piston moves only in circular translational motion while being guided both by the shaft 14 and by the pivotal tube 30.

In another form of construction, the tube 30 is replaced by a ring 60 which is placed around the crank 16 and provided on one side with two diametrically opposite teeth which are engaged with two corresponding grooves 63 of the extremity of the stationary bearing 22 and, on the other side, with two axial teeth 64 which are also diametrically opposite but on a diameter at right angles to the first and which are engaged with corresponding grooves 65 of the sleeve 36 of the piston 6. Both the teeth 62, 64, and the grooves 63, 65 are straight and consequently permit of radial sliding of the two elements but prevent any relative movement of rotation of these latter. The ring 60 is thus locked rotationally both with the piston and the stationary bearing, thereby forestalling any possibility of relative rotation of these latter. On the other hand, the piston is permitted to perform a movement of translation about the axis of the bearing 22 as a result of the sliding motion of the ring with respect to said piston and said stationary bearing.

With these two forms of construction as with that of FIG. 2, a piston or like component which is mounted on the shaft 14 is displaced solely in a circular movement of translation without incurring any risk of any additional extraneous movement of rotation. It is thus ensured that two components which are driven in opposite directions in the manner described will follow curved paths which are symmetrical without thereby increasing the overall space requirements of the assembly as a whole.

What we claim is:

1. A mechanism for driving a component in translational motion along a closed curve and comprising two parallel shafts wherein one shaft is adapted to rotate in a stationary bearing whilst the other shaft is adapted to support the component to be driven and an eccentric-displacement crank forms a junction section between said two shafts, an annular member placed around said crank and rotationally locked on the one hand with said stationary bearing and on the other hand with the component to be driven, said mechanism comprising a tube around the crank and provided with two internal sets of teeth, one internal set being tangent to an outer set of spherical teeth of the stationary bearing and the other internal set being tangent to a set of spherical teeth of the component to be driven, the tube being provided with an internal sleeve which is applied against a knuckle-joint, said knuckle-joint being rigidly fixed to the shaft which carries the component to be driven.

2. A mechanism in accordance with claim 1, characterized in that the internal sleeve is coaxial with the tube and has a spherical internal surface.

3. A mechanism for driving a component in translational motion along a closed curve and comprising two parallel shafts wherein one shaft is adapted to rotate in a stationary bearing whilst the other shaft is adapted to support the component to be driven and an eccentric-displacement crank forms a junction section between said two shafts, an annular member placed around said crank and rotationally locked on the one hand with said stationary bearing and on the other hand with the component to be driven, a tube having an extension at each end in the form of two arms pivotally coupled to a ring which is coaxial with the shaft and which is capable of pivoting diametrically in the stationary bearing or in the component to be driven but which is locked rotationally with respect to said component.

4. A mechanism for driving a component in translational motion along a closed curve and comprising two parallel shafts wherein one shaft is adapted to rotate in a stationary bearing whilst the other shaft is adapted to support the component to be driven and an eccentric-displacement crank forms a junction section between said two shafts, an annular member placed around said crank and rotationally locked on the one hand with said stationary bearing and on the other hand with the component to be driven, the stationary bearing and the component to be driven are each provided with a flange which is intended to support a bellows-type seal, said flange having an extension in the form of a sleeve which is applied against a seal fixed on the tube which surrounds the crank, the complete assembly of tube, sleeves and bellows elements being so arranged as to delimit a safety sealing chamber.

5. A mechanism in accordance with claim 4, characterized in that the tube which surrounds the sleeve comprises a shouldered portion for the purpose of fixing thereon two bellows-type seals each adapted to delimit with the flange, sleeve and seal a safety sealing chamber.

References Cited

UNITED STATES PATENTS

| | | | |
|---|---|---|---|
| 1,915,966 | 6/1933 | Wills | 74—595 |
| 2,860,933 | 11/1958 | Wolff | 74—17.8 |
| 2,863,336 | 12/1958 | Parstorfer | 74—17.8 |
| 2,931,248 | 4/1960 | Musser | 74—640 |
| 2,932,255 | 4/1960 | Neukirch | 64—31 |
| 3,077,117 | 2/1963 | Munro | 74—18.1 |
| 3,187,605 | 6/1965 | Stiff | 74—640 |

FRED C. MATTERN, JR., *Primary Examiner.*

W. S. RATLIFF, JR., *Assistant Examiner.*

U.S. Cl. X.R.

74—17.8, 89.15